(12) United States Patent  
Murakami et al.

(10) Patent No.: US 12,526,633 B2  
(45) Date of Patent: Jan. 13, 2026

(54) PREVENTION OF SUBSCRIBER IDENTITY MODULE SPOOFING FOR MOBILE USER PLANE

(71) Applicant: Arrcus Inc., San Jose, CA (US)

(72) Inventors: Tetsuya Murakami, Sunnyvale, CA (US); Keyur Patel, San Jose, CA (US)

(73) Assignee: Arrcus Inc., San Jose, CA (US)

( * ) Notice: Subject to any disclaimer, the term of this patent is extended or adjusted under 35 U.S.C. 154(b) by 320 days.

(21) Appl. No.: 18/316,667

(22) Filed: May 12, 2023

(65) Prior Publication Data

US 2024/0381094 A1    Nov. 14, 2024

(51) Int. Cl.
| | | |
|---|---|---|
| *H04W 12/122* | (2021.01) | |
| *H04L 12/46* | (2006.01) | |
| *H04L 45/74* | (2022.01) | |
| *H04W 12/033* | (2021.01) | |
| *H04W 12/72* | (2021.01) | |
| *H04W 60/00* | (2009.01) | |

(52) U.S. Cl.
CPC ....... *H04W 12/122* (2021.01); *H04L 12/4633* (2013.01); *H04L 45/74* (2013.01); *H04W 12/033* (2021.01); *H04W 12/72* (2021.01); *H04W 60/00* (2013.01)

(58) Field of Classification Search
CPC ............. H04W 12/122; H04W 12/033; H04W 12/72; H04W 60/00; H04L 12/4633; H04L 45/74
See application file for complete search history.

(56) References Cited

U.S. PATENT DOCUMENTS

| | | | |
|---|---|---|---|
| 7,945,658 B1 * | 5/2011 | Nucci | H04L 41/22 |
| | | | 709/239 |
| 8,078,758 B1 | 12/2011 | Callon | |
| 11,224,093 B2 | 1/2022 | Bharatia | |
| 11,445,525 B1 | 9/2022 | Sawczuk | |
| 11,689,502 B2 | 6/2023 | Burakovsky | |
| 11,690,130 B2 | 6/2023 | Talebi Fard | |
| 11,785,668 B2 | 10/2023 | Talebi Fard | |
| 12,010,202 B2 | 6/2024 | Chun | |
| 12,010,610 B2 | 6/2024 | Qiao | |
| 12,126,658 B2 | 10/2024 | Peinado Gomez | |
| 12,177,939 B2 | 12/2024 | Talebi Fard | |
| 2007/0183404 A1 | 8/2007 | Hofer | |
| 2015/0131663 A1 | 5/2015 | Brar | |
| 2019/0349396 A1 | 11/2019 | Compton | |
| 2020/0213358 A1 | 7/2020 | Helfinstine | |
| 2020/0267513 A1 | 8/2020 | Zhu | |
| 2020/0336420 A1 * | 10/2020 | Joshi | G06F 9/45558 |
| 2020/0344156 A1 | 10/2020 | Park | |

(Continued)

FOREIGN PATENT DOCUMENTS

WO    2022115129    6/2022

*Primary Examiner* — Christopher M Brandt
(74) *Attorney, Agent, or Firm* — David R. Stevens; Stevens Law Group

(57) ABSTRACT

Prevention of SIM spoofing in mobile user plane. A method includes generating a border gateway protocol (BGP) flow specification based on a range of Internet Protocol (IP) addresses associated with routes for one or more user equipment devices. The method includes, in response to receiving a packet from a node within a radio access network, verifying an inner IP packet encapsulation based on the BGP flow specification.

20 Claims, 14 Drawing Sheets

(56) References Cited

U.S. PATENT DOCUMENTS

| | | |
|---|---|---|
| 2021/0336870 A1* | 10/2021 | Zhao .................. H04L 45/64 |
| 2021/0409375 A1 | 12/2021 | Burakovsky |
| 2022/0132623 A1 | 4/2022 | Xu |
| 2022/0150181 A1 | 5/2022 | Parker |
| 2022/0210796 A1 | 6/2022 | Jimenez Cordon |
| 2022/0345933 A1 | 10/2022 | Patel |
| 2022/0345986 A1 | 10/2022 | Patel |
| 2022/0400375 A1 | 12/2022 | Schmitt |
| 2023/0033588 A1 | 2/2023 | Marupaduga |
| 2023/0370372 A1* | 11/2023 | Mishra .................. H04L 45/04 |
| 2024/0430347 A1 | 12/2024 | Ihlar |

* cited by examiner

Control Plane Behavior
ST1 Route

Control Plane Behavior
ST2 Route

Data Plane Behavior
ST1 Route

Data Plane Behavior
ST2 Route

Control Plane Behavior

Data Plane Behavior

1000

PDU Session Entry

| PFCP Proxy (datastore) 1002 | Note |
|---|---|
| IMSI | Device ID |
| UPF N4 Address | |
| SMF N4 Address | |
| IMEI | |
| SEID | PFCP Session ID |
| N6 Network Isntance | |
| N3 Network Instance | |
| N3 TEID | TEID For Downlink |
| N6 TEID | TEID For Uplink |
| QFI | |
| UPF N3 Address | IP Address For GTP Tunneling |
| gNodeB N3 Address | IP Address For GTP Tunneling |
| IPv4 UE Address | IPv4 Address Assigned To A Device |
| IPv6 UE Address | IPv6 Address Assigned To A Device |
| Forwarding | Packet Forwarding State |

FIG. 10

PREVENTION OF SUBSCRIBER IDENTITY MODULE SPOOFING FOR MOBILE USER PLANE

TECHNICAL FIELD

The disclosure relates to computing networks and particularly relates to preventing subscriber identity module (SIM) spoofing within the mobile user plane.

BACKGROUND

Subscriber identity module (SIM) spoofing refers to a type of fraud wherein an attacker gains access to another person's SIM card. The SIM card is a chip inserted into user equipment in communication with a cellular network, such as a mobile phone, tablet, laptop, and so forth. The SIM card identifies the user to the cellular network and is used to make calls or access data over the network. SIM spoofing can have serious consequences for the victim, as the attacker can use the victim's phone number and SIM card to gain access to sensitive information, such as bank accounts or email accounts that rely on two-factor authentication.

SIM spoofing can occur through various means, including when the attacker has physical possession of the SIM card or when the attacker attempts to trick a cellular network into believing a data packet is has been from the SIM card. Because SIM spoofing prevents a significant data breech and can present serious security consequences for the victim, it is important to develop systems, methods, and devices to identifying and preventing SIM spoofing attacks.

Considering the foregoing, disclosed herein are systems, methods, and devices for preventing SIM spoofing within the mobile user plane.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where:

FIG. 10 is a chart illustrating an example protocol data unit (PDU) session entry;

DETAILED DESCRIPTION

Figure 1:
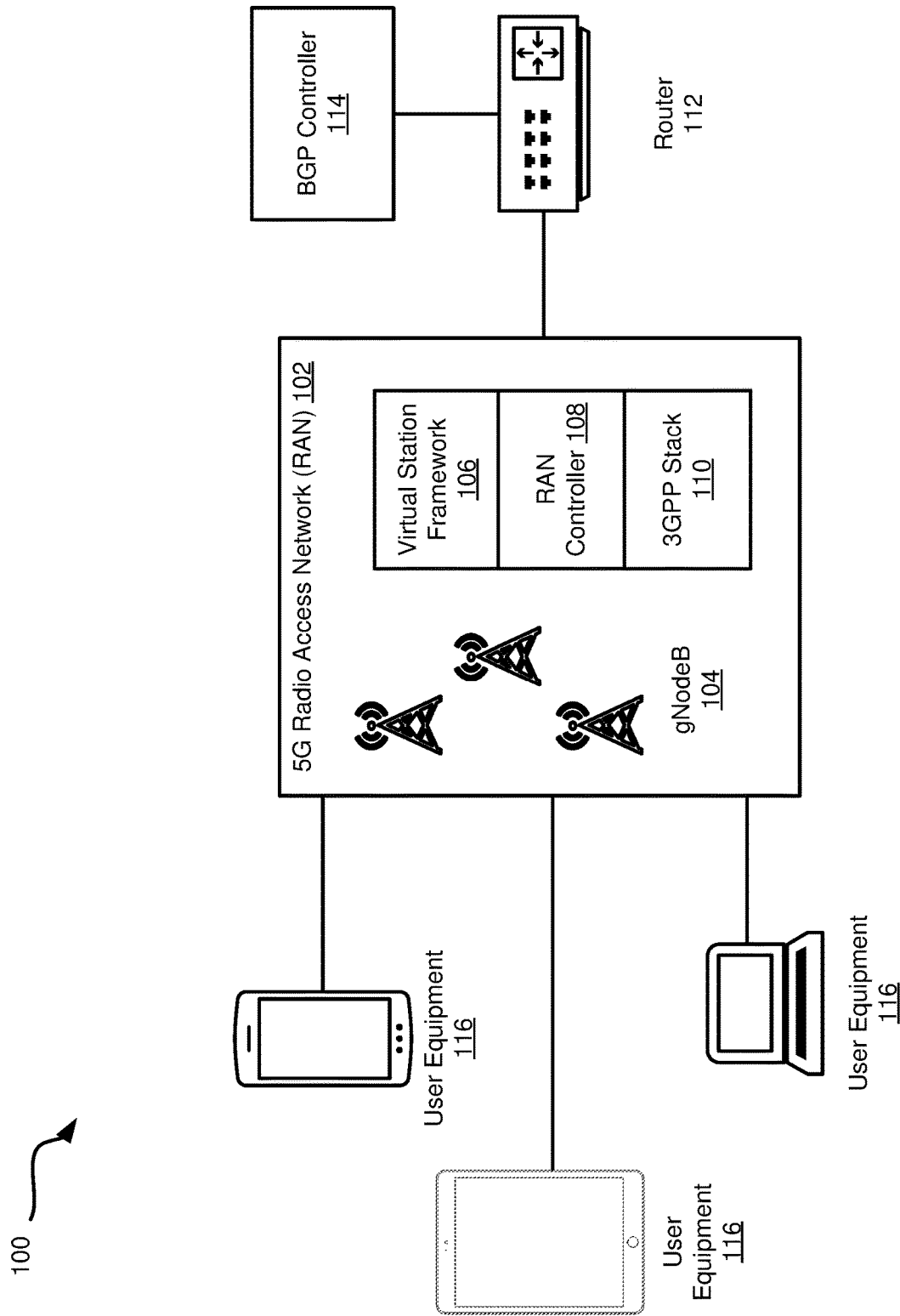
FIG. 1 is a schematic diagram of an example system of networked devices communicating over the Internet by way of a 5G radio access network (RAN)

Disclosed herein are systems, methods, and devices for preventing subscriber identity module (SIM) spoofing within the mobile user plane (MUP). The systems, methods, and devices described herein may specifically be implemented within a 5G radio access network (RAN), wherein user equipment devices such as mobile phones, tablets, and laptops, are connecting to the Internet (or another network) by way of the 5G RAN.

A SIM card, or subscriber identity module card, is a small chip inserted into a mobile phone (or other user equipment device connected to a cellular network) to identify the mobile phone to the network. The SIM card serves as a critical component of mobile communication and allows a user to make calls, send text messages, and access data services. The SIM card contains important information about the user, such as their phone number, network service provider, and other identifying information. When a user inserts their SIM card into a mobile phone, the phone is capable of connecting to a network so the user can make calls and access data services.

SIM spoofing is a type of fraud in which an attacker gains unauthorized access to another person's mobile phone number and SIM card. SIM spoofing can occur through various means, including stealing the physical SIM card, or through "tricking" a router into believing a data packet was sent from the device comprising the SIM card, when the data packet was actually sent from another device entirely. SIM spoofing can have serious consequences for the victim because the attacker can use the victim's phone number and SIM card to gain access to sensitive information, such as bank accounts or email accounts, which rely on two-factor authentication.

The systems, methods, and devices described herein are designed to prevent SIM spoofing within the mobile user plane. Systems described herein deploy a packet forwarding control protocol (PFCP) proxy between components of a network architecture. The PFCP proxy snoops messages within the network architecture to acquire addresses for user equipment devices, addresses for nodes within the network, and tunnel endpoint identifiers. The data points snooped by the PFCP proxy are used to verify that messages received from user equipment devices were validly and actually created by those user equipment devices, and not by an attacking device attempting to execute a SIM spoofing attack.

The following is presented as further background for the disclosures presented herein. In a computer network environment, a networking device such as a switch or router may be used to transmit information from one destination to a destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located far from the person's computer. It is likely that there is no direct communication between the router at the person's home and the remote server. Therefore, the data package and the message must travel by "hopping" to different networking devices until reaching the destination at the remote server. The router at the person's home must determine a route for transmitting the data package and the message thru multiple different devices connected to the Internet until the data package and the message reach the destination at the remote server.

The processes of determining a best bath from a first location to a destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g., computers, routers, switches, and other devices) and an indication of the linkages between nodes. Disclosed herein are systems, methods, and devices for improving network topology and network routing.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is like the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e., the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A virtual local area network (VLAN) is a broadcast domain that is partitioned and isolated in a computer network at the data link layer. A VLAN may apply tags to network frames and handle those tags in networking systems to create the appearance and functionality of network traffic that is physically on a single network but acts as if it is split between separate networks. VLANs can keep network applications separate despite being connected to the same physical network, and without requiring multiple sets of cabling and networking devices to be deployed.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet by way of a radio access network (RAN). The system 100 includes a 5G radio access network (RAN) 102, which includes a number of nodes for communicating with user equipment 116. Each of the nodes within the 5G RAN 102 may specifically include a gNodeB 104 as described herein. The 5G RAN 102 further includes a virtual station framework 106, RAN controller 108, and 3GPP stack 110. The 5G RAN 102 communicates with a router 112, which in turn communicates with a BGP controller 114.

The 5G RAN 102 network consists of a control plane and a user plane. The control plane is used for setting up data paths and data path policies for each user equipment (UE) 116 in communication with the 5G RAN 102. The user plane is used for carrying data packets to and from the UE 116. In some cases, network slicing is implemented within the user plane (not the control plane), but actual network slicing and packet forwarding over a target network slice occurs in the user plane. PFCP (packet forwarding control protocol) severs as the control protocol for the 5G RAN 102.

The router 112 is a networking device that forwards data packets between computer networks. The router 112 performs traffic direction functions on the Internet. The router 112 may have interfaces for diverse types of physical layer connections, such as copper cables, fiber optic, or wireless transmission. The router 112 can support different network layer transmission standards. Each network interface is used to enable data packets to be forwarded from one transmission system to another. Routers 112 may also be used to connect two or more logical groups of computer devices known as subnets, each with a different network prefix. The router 112 can provide connectivity within an enterprise, between enterprises and the Internet, or between internet service providers' networks as shown in FIG. 1. Some routers 112 are configured to interconnecting various internet service providers or may be used in large enterprise networks. Smaller routers 112 typically provide connectivity for home and office networks to the Internet. The router 112 shown in FIG. 1 may represent any suitable router for network transmissions such as an edge router, provider edge router, cell site router, subscriber edge router, inter-provider border router, core router, internet backbone, port forwarding, voice/data/fax/video processing routers, and so forth.

It should be noted that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. Considering the foregoing, disclosed herein are systems, methods, and devices for offloading best path computations to an external device to enable greater customizability in determining a best path algorithm that is well suited to a certain grouping of computers or a certain enterprise.

Figure 2:
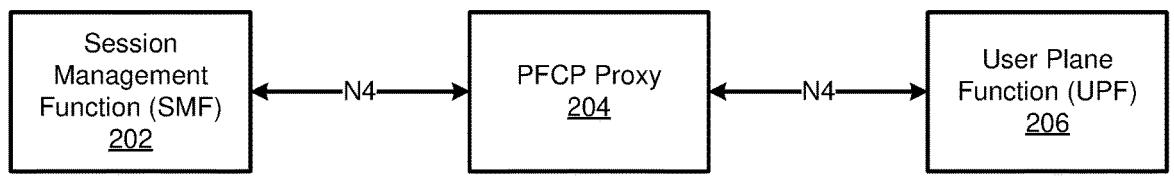
FIG. 2 is a schematic block diagram of a system for communications between components of a network architecture.

FIG. 2 is a schematic block diagram of a system 200 for communications between components of a network architecture and may specifically apply to a 5G service-based network architecture. The system 200 includes a session management function (SMF) 202, a packet forwarding control protocol (PFCP) proxy 204, and a user plane function (UPF) 206.

The PFCP (packet forwarding control protocol) is a communication protocol used in 5G RAN 102 networks to manage and control the flow of data traffic. The PFCP proxy 204 is a network entity that acts as an intermediary between the 5G core network and the user equipment (UE) 116 or other network entities. The PFCP proxy 204 is responsible for forwarding PFCP messages inside of the 5G core network, and for implementing policies that control the flow of data traffic. The SMF 202 and the UPF 206 use the PFCP to establish a data path and/or a data path policy for a given UE 116. The PFCP proxy 204 sits between the SMF 202 and the UPF 206 and forwards PFCP messages to the SMF 202 and the UPF 206. The PFCP proxy 204 plays an important role in enabling 5G network slicing, which allows multiple logical networks to be created on a single physical infrastructure. The PFCP proxy 204 can be used to route PFCP messages based on policies defined by the network operator.

The PFCP proxy 204 traps protocol data unit (PDU) session information exchanged between the SMF 202 and the UPF 206. The PFCP proxy 204 acquires PDU session information per-IMSI (international mobile subscriber identity). Multiple PDU sessions for a given device (with a given IMSI) might be created with a different SEID (security element identifier) to assign multiple IP addresses to a given device.

In 5G mobile network, the SMF stands for the session management function. The SMF 202 is a network function responsible for managing sessions between the UE 116 and the 5G core network. The SMF 202 is responsible for creating, modifying, and terminating the sessions between the UE 116 and the 5G core network. The SMF 202 also manages the authentication and security functions for the session and handles the allocation and release of resources required for the session. The SMF 202 is a core component of 5G network, as it is responsible for ensuring that sessions are established and maintained efficiently and securely. The SMF 202 is primarily responsible for interacting with the decoupled data plane and for creating, updating, and removing PDU sessions. Additionally, the SMF 202 manages session context with the UPF 206. The PFCP proxy 204 sits between the SMF 202 and the UPF 206. The SMF 202 sends messages to the UPF 206 over the N4 reference interface using packet forwarding control protocol (PFCP). These messages are processed through the PFCP proxy 204 prior to reaching the UPF 206.

In 5G mobile network, UPF stands for user plane function. The UPF 206 is a network function responsible for handling user plane traffic, which is the actual data traffic that is transmitted between the UE 116 and the rest of the network. The UPF 206 is responsible for forwarding user plane packets between the UE 116 and the rest of the network, and for applying quality of service policies to the traffic. The UPF 206 also performs functions such as packet inspection, filtering, and manipulation, and may perform functions such as packet buffering and retransmission.

Figure 3:
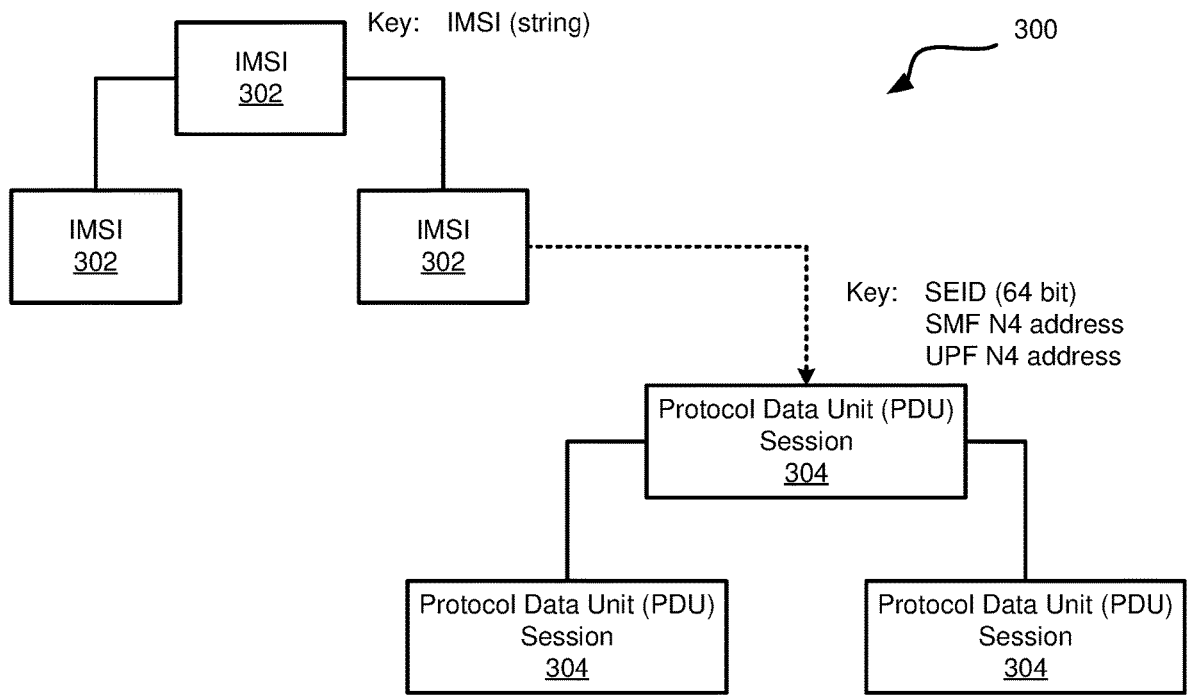
FIG. 3 is a schematic block diagram of a process flow for logging communication within a network architecture.

FIG. 3 is a schematic block diagram of a process flow 300 for logging communications within a network architecture, such as a 5G service-based network architecture. The process flow 300 includes tracking all PDU session information changes per-IMSI.

The international mobile subscriber identity (IMSI) 302 is a unique identifier assigned to each mobile network subscriber and is used to identify and authenticate the subscriber on the network. In most cases, the IMSI 302 is a 15-digit number assigned to the SIM card of a mobile subscriber. When a mobile subscriber is switched on and connects to a mobile network, the network uses the IMSI 302 to authenticate the subscriber and determine the services and features the subscriber is authorized to use. The IMSI 302 is used in combination with other identifiers, such as the mobile station international subscriber director number (MSISDN), which is the phone number associated with the SIM card, to enable mobile communication services such as voice, messaging, and data services.

The IMSI 302 is also used in the process of authenticating the subscriber to the network, which helps ensure the security of mobile communications. When a mobile phone connects to a network, the network challenges the SIM card to provide the IMSI 302 and other authentication information. If the authentication is successful, the subscriber is granted access to the network.

In 5G mobile network, a packet data unit (PDU) session is a type of data session that is established between the UE 116 and the 5G core network. The PDU session 304 is used to transport data packets between the UE 116 and the 5G core network. The PDU session 304 is established by the SMF 202 in the 5G core network, and it is managed by the UPF 206. The PDU session 304 is used to support various types of data traffic, such as internet traffic, multimedia traffic, and other types of data traffic. The PDU session 304 can be configured with specific quality of service parameters, which determine the level of service that is provided to the data traffic. These parameters can include metrics such as data rate, latency, packet loss, and other facts determining the quality of the data session.

The systems described herein are implemented to detect gNodeB 104 N3 address changes for a given UE 116 (i.e., for a given IMSI) when the UE 116 moves to another 5G RAN 102. Additionally, the systems described herein are implemented for alarm detection in response to exceeding the number of PDU sessions for a given UE 116 (i.e., for a given IMSI) rather than the configured limit. Multiple PDU sessions for a given UE 116 have different gNodeB 104 N3 addresses with the different UE 116 address for over n seconds, and this increase the possibility of SIM spoofing.

Figure 4:
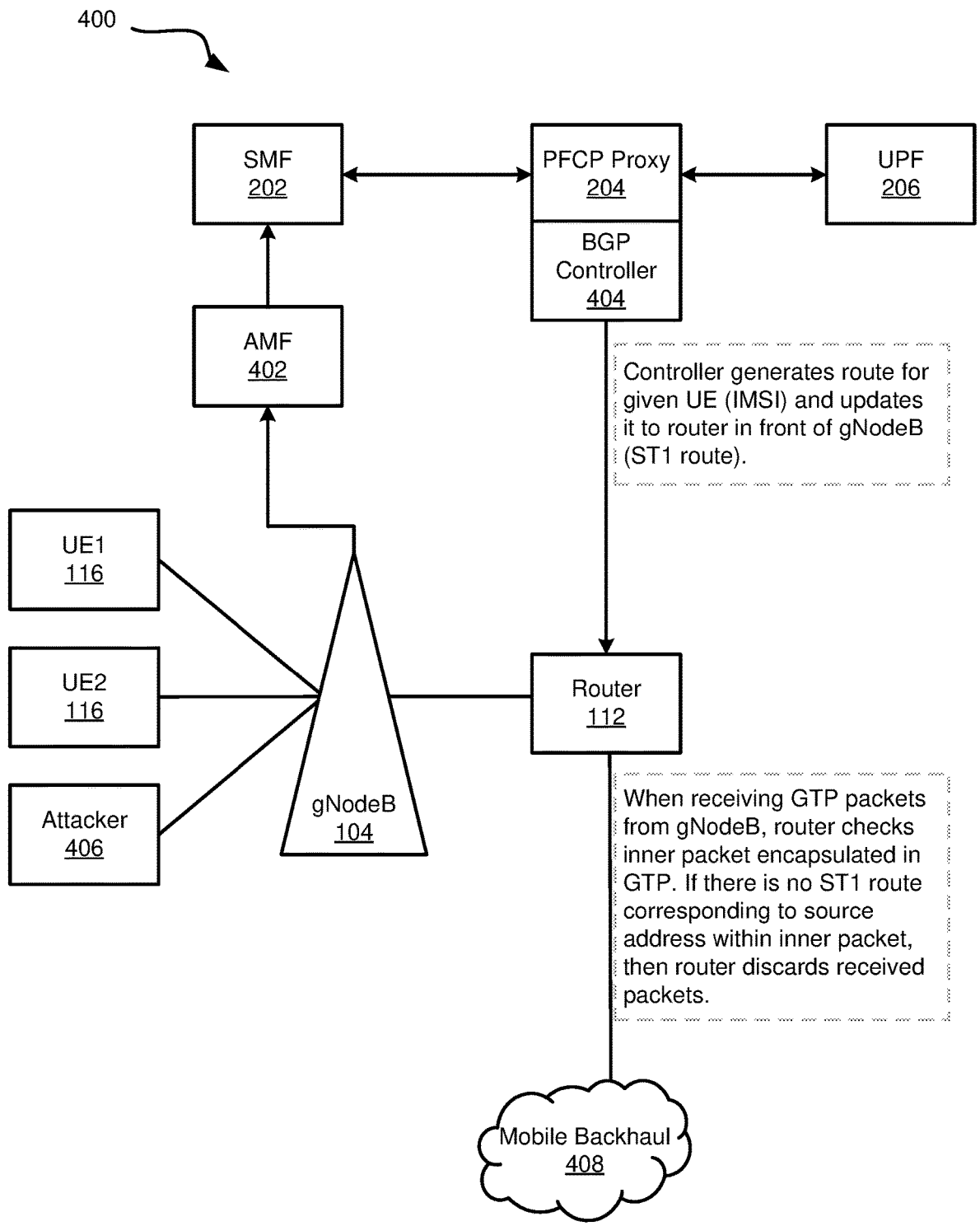
FIG. 4 is a schematic diagram of a system for preventing SIM spoofing within the mobile user plane.
Figure 5A:
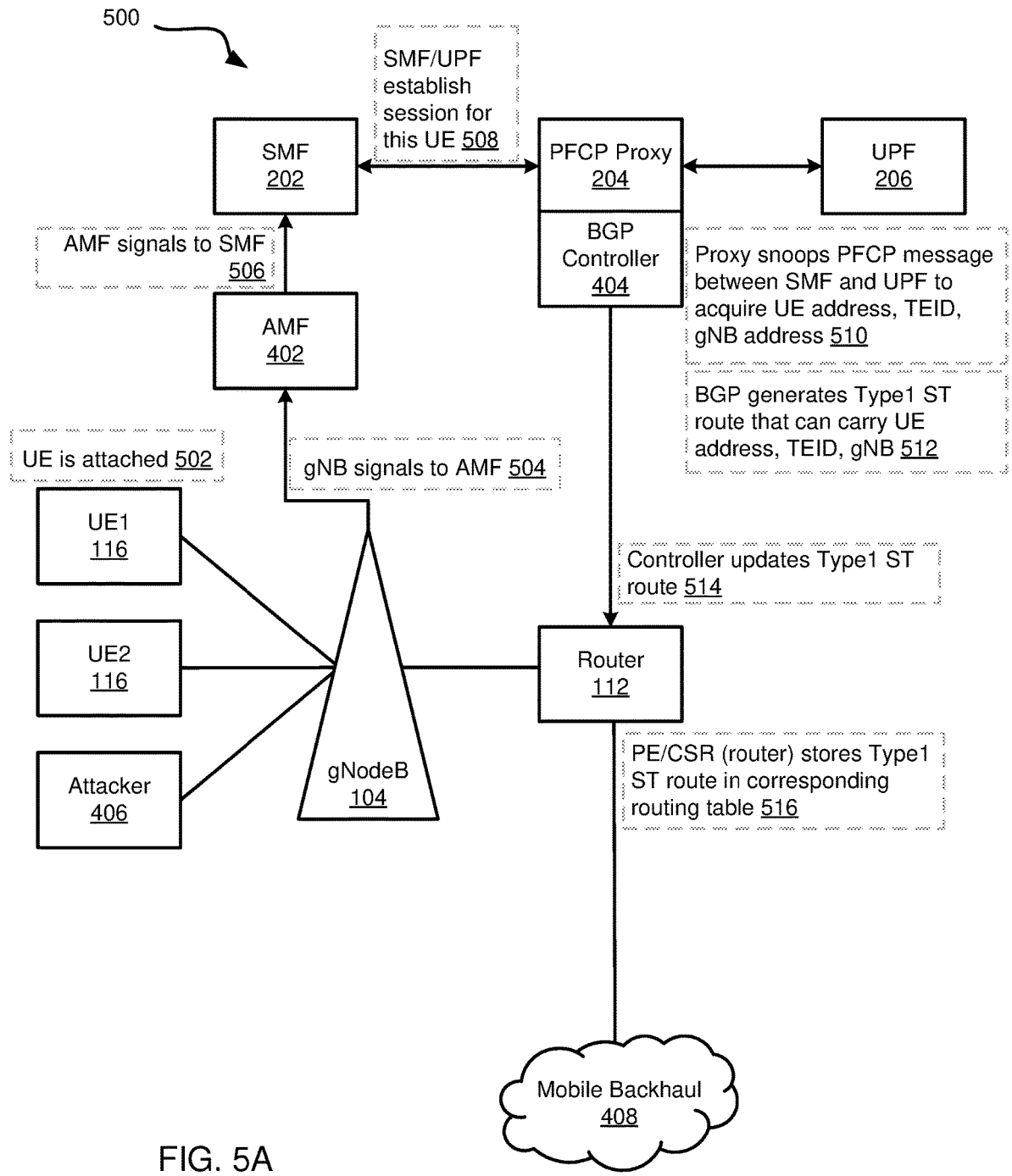
FIG. 5A is a schematic diagram of a system and control plane process flow for preventing SIM spoofing within the mobile user plane, wherein the process flow relies on a Type 1 Session Transformed (ST1) route.
Figure 5B:
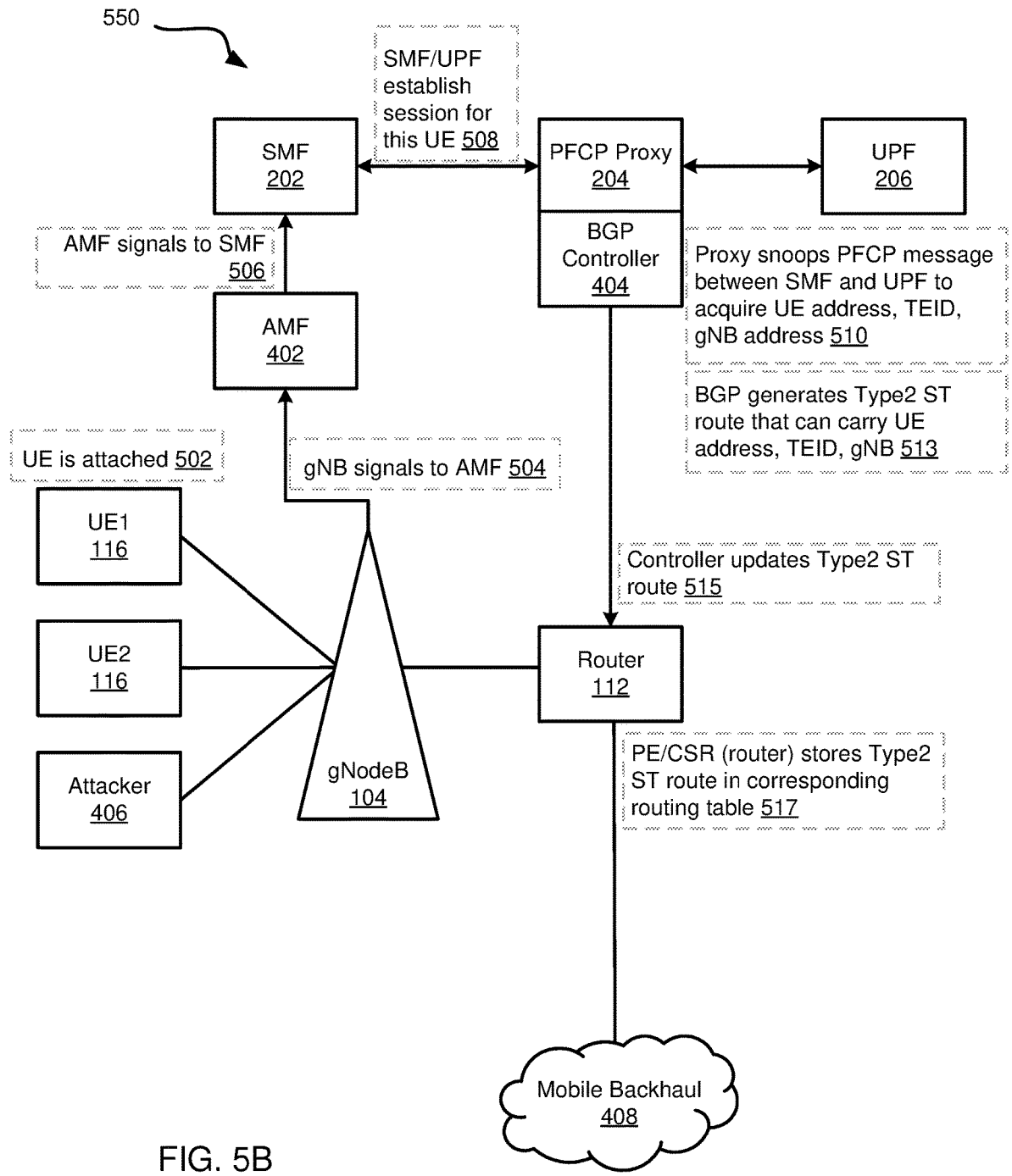
FIG. 5B is a schematic diagram of a system and control plane process flow for preventing SIM spoofing within the mobile user plane, wherein the process flow relies on a Type 2 Session Transformed (ST2) route.
Figure 6A:
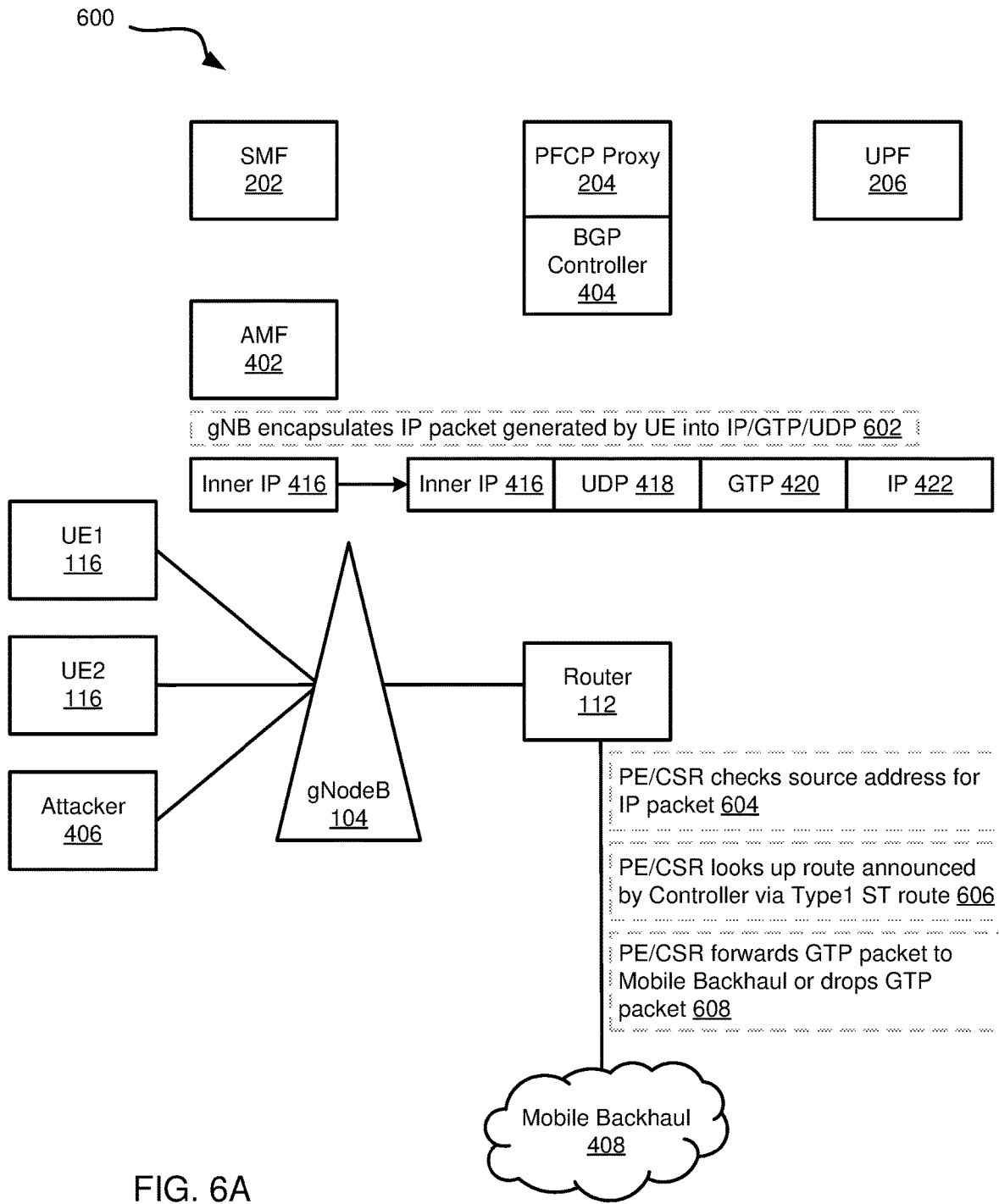
FIG. 6A is a schematic diagram of a system and data plane process flow for preventing SIM spoofing within the mobile user plane, wherein the process flow relies on the ST1 route.
Figure 6B:
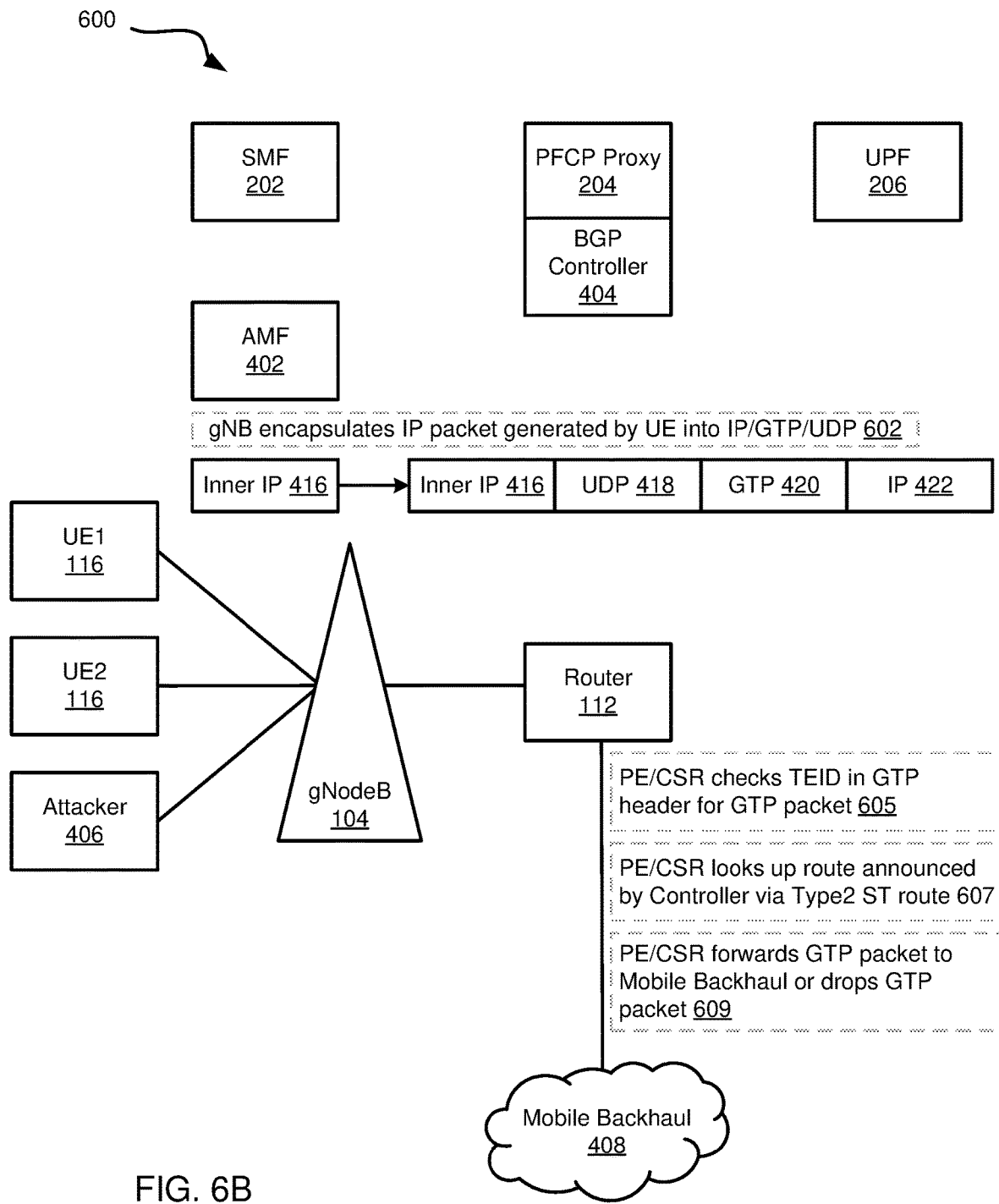
FIG. 6B is a schematic diagram of a system and data plane process flow for preventing SIM spoofing within the mobile user plane, wherein the process flow relies on the ST2 route.

FIGS. 4, 5A-5B, and 6A-6B are schematic diagrams of systems and process flows for an implementation for preventing SIM spoofing of a mobile user plane (MUP). FIG. 4 is a schematic diagram illustrating an overview of the system 400 for preventing SIM spoofing. FIGS. 5A and 5B are schematic diagrams of example process flows for the control plane, wherein the process flow 500 illustrated in FIG. 5A relates to a Type 1 Session Transformed (ST1) route, and the process flow 550 illustrated in FIG. 5B relates to a Type 1 Session Transformed (ST2) route. FIGS. 6A and 6B are schematic diagrams of example process flows for the data plane, wherein the process flow 600 illustrated in FIG. 6A relates to the ST1 route, and the process flow 650 illustrated in FIG. 6B relates to the ST2 route. Thus, the process flows 500, 600 illustrated in FIGS. 5A and 6A each relate to the ST1 route and correspond with one another. Likewise, the process flows 550, 650 illustrated in FIGS. 5B and 6B each relate to the ST2 route and correspond with one another.

The system 400 includes the SMF 202 in communication with the UPF 206 by way of the PFCP proxy 204. The PFCP proxy 204 communicates with a BGP (border gateway protocol) controller 404. The SMF 202 receives communications from the access and mobility management function (AMF) 402. The AMF 402 is in communication with the gNodeB 410, which is a node in a cellular network that provides connectivity between user equipment (UE) 116 and the evolved packet core (EPC) by way of the router 112. The gNodeB 410 is the functional equivalent of a base station in a traditional cellular network. The gNodeB 104 receives traffic from a plurality of user equipment devices 116, including the exemplary UE1 and UE2 illustrated in FIG. 4. The system 400 includes an attacker 406 attempting to engage in SIM spoofing or SIM swap fraud, wherein a phone number is transferred to another device without authorization. The system 400 includes a mobile backhaul 408.

The BGP controller 404 generates a route for each UE 116 (i.e., for each unique IMSI associated with each UE 116). The BGP controller 404 updates the generated route to the router 112 in front of the gNodeB 104.

The router 112 receives GTP (GPRS tunneling protocol) packets from the gNodeB 104. When the router 112 receives a GTP packet, the router 112 checks the inner packet encapsulated within the GTP packet. If there is no Type 1 Session Transformed (ST1) route corresponding to the source address in the inner packet, the router 112 discards the received packet as being received from an invalid user.

The router 112 includes one or more of a provider edge (PE) router or a cell site router (CSR). The router 112 receives all UE 116 routes (i.e., an ST1 route) and then verifies the inner source IP (Internet protocol) address for each UE 116. This verification process may include a reverse-path-forwarding (RPF) check. The RPF check is executed to reduce forwarding of IP packets that might be spoofing an address. The unicast RPF check performs a forwarding table lookup on an IP packet's source address and checks the incoming interface. The router 112 determines whether the packet is arriving from a path that the sender would use to reach the destination. If the packet is from a valid path, the router 112 forwards the packet to the destination address. If the packet is not from a valid path, the router 112 discards the packet. Specifically, the router 112 determines if the routing entry corresponding to the inner source IP address for the UE 116 is present; if the routing entry is not present, the router 112 discards the received packet The unicast RPF check is supported for IPV4 and IPV6 protocol families, as well as for virtual private network (VPN) address families.

The mobile backhaul 408 is the process of connecting the RAN 102 of a mobile network to the core network. The RAN 102 is the part of the mobile network that provides wireless access to the users, while the core network is the part of the network that provides the services and manages the traffic. The mobile backhaul 408 enables efficient and reliable transport of traffic between the RAN 102 and the core network. The mobile backhaul 408 can be composed of various types of connections, including fiber, microwave, and satellite links. The mobile backhaul 408 connects cell site air interfaces to wireless networks, which are subsequently connected to data centers that host the content and applications accessed by mobile users.

The systems and methods described herein utilize Type 1 Session Transformed (ST1) routes and Type 2 Session Transformed (ST2) routes. A BGP ST1 route specific BGP-MUP NLRI comprises an route distinguisher (8 octets), a prefix length (1 octet), a prefix (variable), and an architecture specific (variable). A BGP 3 gpp-5 g ST1 route specific BGP-MUP NLRI comprises a tunnel endpoint identifier (TEID) (4 octets), a QFI (1 octet), an endpoint address length (1 octet), and an endpoint address (variable). A BGP ST2 route specific BGP-MUP NLRI comprises an route distinguisher (8 octets), an endpoint length (1 octet), an endpoint address (variable), and an architecture specific endpoint identifier (variable).

A BGP speaker acting as a BGP controller 404 generates the ST1 route from corresponding session information through a northbound API. When advertising the ST1 route, the BGP controller 404 should attach a route target extended communication with the UEs 116 are importing into the routing instance for the corresponding direct segment.

A BGP speaker acting as an MUP controller generates the ST2 route from corresponding session information through a northbound API, or predefined configurations. In a 3GPP 5G specific case, composing the ST2 route includes acquiring the endpoint, which consists of the endpoint address of the GTP tunnel and the TEID for the core side with the effective length of the endpoint as input parameters. The controller decides the route distinguisher of the ST2 route based on operator policy. When advertising the ST2 route, the controller should attach a BGP MUP extended community corresponding to the direct segment. The subtype of the extended community is direct-type segment identifier. This segment identifier is generated from the information received through a northbound API, or a predefined configuration.

FIGS. 5A and 5B illustrates process flow 500, 550 for the control plane of the 5G RAN 102. The process flow 500 illustrated in FIG. 5A includes generation of an ST1 route, and the process flow 550 illustrated in FIG. 5B includes generation of an ST2 route. FIGS. 6A and 6B illustrate process flows 600, 650 for the data plane of the 5G RAN 102. The process flow 600 illustrated in FIG. 6A includes decision-making based on an ST1 route, and the process flow 650 illustrated in FIG. 6B includes decision-making based on an ST2 route. Thus, FIGS. 5A and 6A each pertain to the ST1 route, and FIGS. 6A and 6B each pertain to the ST2 route.

The control plane process flow 500 illustrated in FIG. 5A begins with step 502, wherein the user equipment (UE) 116 is attached to the gNodeB 104. The process flow 500 continues with step 504, wherein the gNodeB 104 signals to the access and mobility management function (AMF) 402. At step 506, the AMF 402 signals to the session management function (SMF) 202. At step 508, the SMF 202 and user plane function (UPF) 206 establish a session for the UE 116. At step 510, the PFCP proxy 204 snoops PFCP messages between the SMF 202 and the UPF 206 to acquire the address for the UE 116, the tunnel endpoint identifier (TEID), and the address for the gNodeB 104. At step 512, the BGP controller 404 generates a Type1 ST route that can carry the UE 116 address, the TEID, and the gNodeB 104 address. At step 514, the BGP controller 404 updates the Type 1 ST route. At step 516, the router 112 (one or more of the provider edge router or the cell site router) stores the Type1 ST route in a corresponding routing table.

The data plane process flow 600 illustrated in FIG. 6A corresponds with the control plane process flow 500 illustrated in FIG. 5A, which pertains to the use of an ST1 route. The process flow 600 begins at step 602, wherein the gNodeB 104 encapsulates the inner IP packet 416 generated by the UE 116 into the inner IP packet 416, a user datagram protocol (UDP) packet 418, a GPRS tunneling protocol (GTP) packet 420, and an IP (Internet protocol) packet 422. The process flow 600 continues and at step 604, the router 112 (one or more of the provider edge router or the cell site router) checks the source address for the IP packet 422. The router 112 checks the source address for the inner IP packet 416 when the GTP packet 420 arrives at the router 112. At step 606, the router 112 looks up the route announced by the BGP controller 404 via the Type1 ST route. If the packet is generated by the valid UE 116, the corresponding route should be present because the UE 116 address is announced by the BGP controller 404 by way of the Type1 ST route, and the local stores on the router 112. At step 608, the router 112 forwards the GTP packet 420 to the mobile backhaul 408 or drops the GTP packet 420. If the route is present, the router 112 forwards the GTP packet 420 to the mobile backhaul 408. If the route is not present, the router 112 filters or drops the received GTP packet 420.

The control plane process flow 550 illustrated in FIG. 5B pertains to the use of an ST2 route. This process flow 550 proceeds with the same steps 502, 504, 506, 508, 510 discussed in connection with FIG. 5A. The process flow 550 differs from the process flow 500 based on the route type, wherein the process flow 500 utilizes an ST1-type route, and the process flow 550 utilizes an ST2-type route. In the process flow 550, the BGP controller 404 generates a Type 2 Session Transformed (ST2) route that can carry the UE 116 address, TEID, and gNodeB 104 at 513. The BGP controller 404 updates the router 112 with the ST2 route at 515. The router 112 stores the ST2 route in the corresponding routing table at 517.

The data plane process flow 650 illustrated in FIG. 6B corresponds with the control plane process flow 550 that is illustrated in FIG. 5B, which also pertains to the use of an ST2 route. This process flow 650 proceeds similarly to the process flow 600 illustrated in FIG. 6A, wherein the gNodeB 104 encapsulates the IP packet generated by the UE 116 at step 602. At step 605, the router 112 checks the TEID in the GTP packet 420 header of the packet coming from the gNode B 104. the router 112 looks up the route announced by the BGP controller 404 via a Type 2 Session Transformed (ST2) route at step 607. Then, when receiving the GTP packet, the router 112 checks the TEID in the GTP header. If the STP2 route is present and corresponding with the TEID in the GTP header, then the router 112 determines the packet is okay at step 609. Otherwise, if the STP2 route does not correspond with the TEID in the GTP header, then the router 112 discards the received GTP packet at step 609.

In the ST1 process flows 500 and 600, the inner source address is checked based on the ST1 route, and the ST2 route can carry the UPF 206 address and the TEID for upline. In the ST2 process flows 550 and 650, instead of the ST1 route, the router 112 receives the ST2 route from the BGP controller 404. The ST1 route also carries the TEID, but the TEID in the ST1 route is utilized for downlink traffic from the UPF 206 to the gNodeB 104. The ST2 route includes the TEID for the uplink traffic from the gNodeB 104 to the UPF 206.

Figure 7:
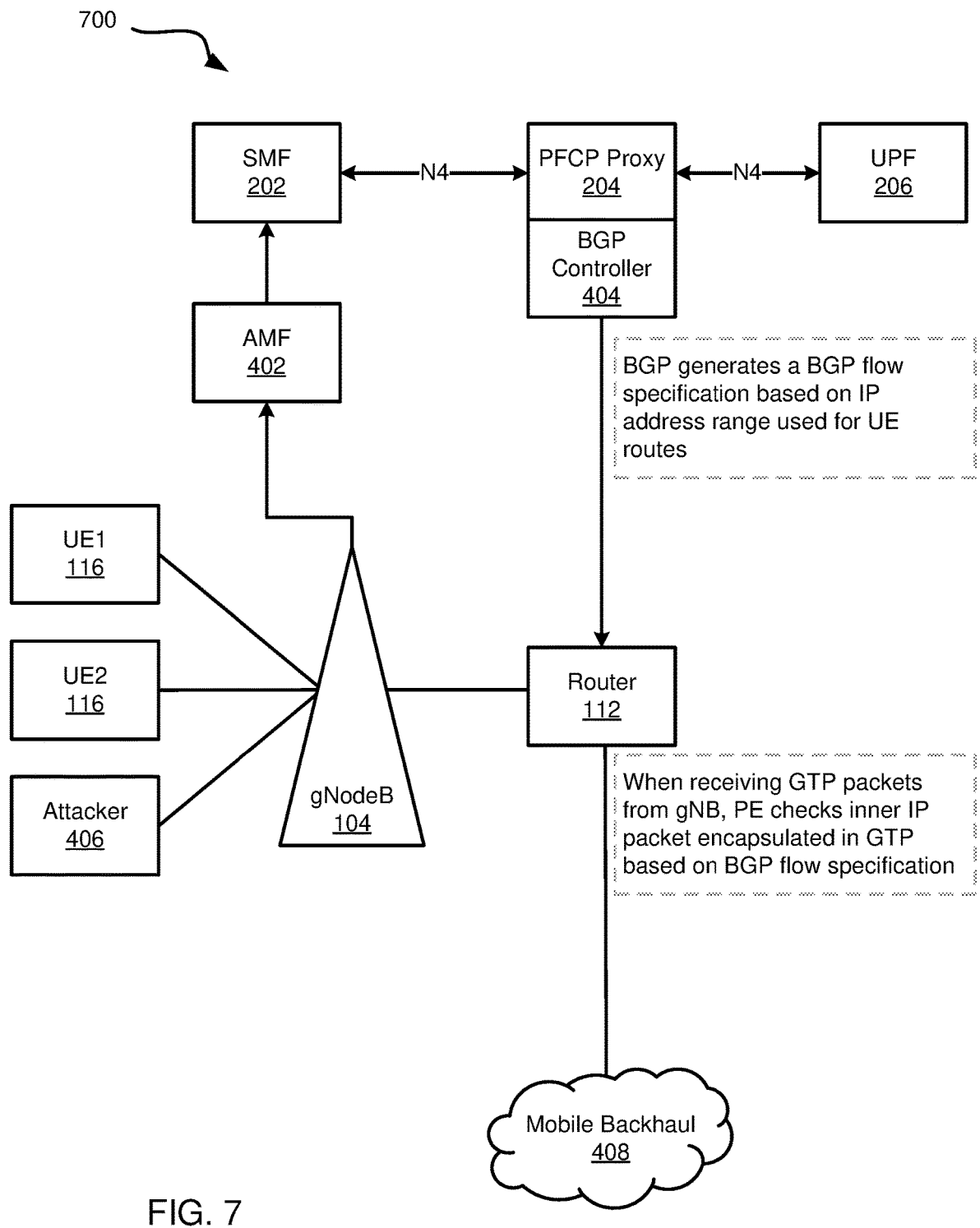
FIG. 7 is a schematic diagram of a system for preventing SIM spoofing within the mobile user plane.
Figure 8:
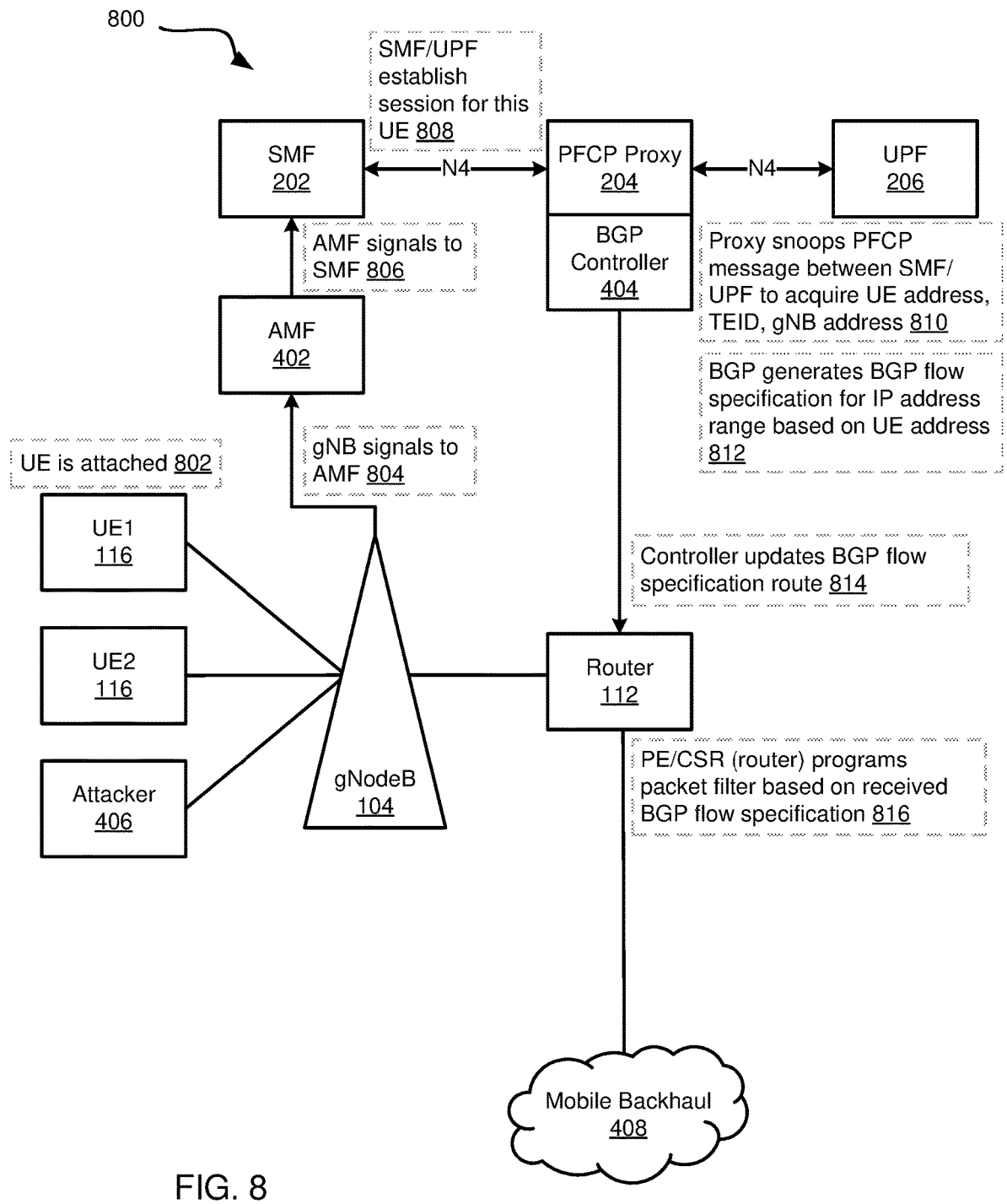
FIG. 8 is a schematic diagram of a system and control plane process flow for preventing SIM spoofing within the mobile user plane.
Figure 9:
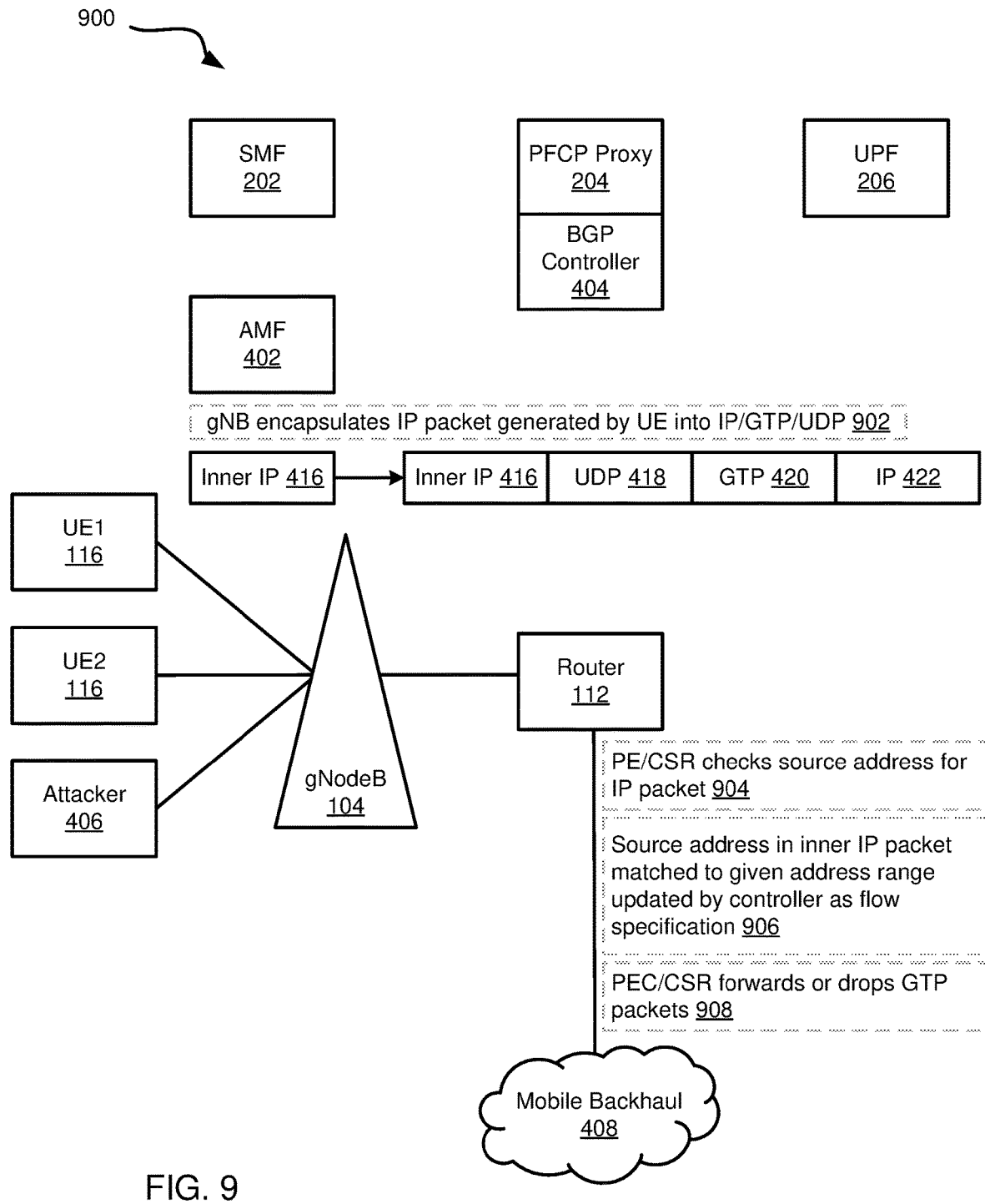
FIG. 9 is a schematic diagram of a system and data plane process flow for preventing SIM spoofing within the mobile user plane.

FIGS. 7-9 are schematic diagrams of systems and process flows for an implementation for preventing SIM spoofing of a mobile user plane (MUP). FIG. 7 is a schematic diagram illustrating an overview of the system 700 for preventing SIM spoofing. FIG. 8 is a schematic diagram of a process flow 800 for the control plane. FIG. 9 is a schematic diagram of a process flow 900 for the data plane.

The system 700 includes the same components illustrated and discussed in connection with FIG. 4. However, in the implementation illustrated in FIG. 7, the BGP controller 404 calculates a BGP flow specification (border gateway protocol flow specification) based on an IP specification range assigned to all UEs 116, and then provides the BGP flow specification to the router 112. The BGP controller 404 calculates the BGP flow specification in lieu of receiving all UE 116 routes. In this model, the router 112 does not need to store all UE 116 routes. Based on the BGP flow specification updated by the BGP controller 404, the router 112 can filter out packets from invalid users.

In the implementation described in FIG. 7, the BGP controller 404 generates a BGP flow specification based on an IP address range used for the UE 116 routes. The BGP flow specification is a network protocol that uses the BGP (border gateway protocol) to provide more granular control over traffic flows within a routed domain. The BGP flow specification is designed to improve the scalability and security of distributed network by allowing administrators to selectively route or deny traffic based on specific criteria, such as source or destination IP address, ports, packet-size, and protocol. Network administrators can leverage the BGP flow specification to quickly respond to changing network demands with policies that can be applied globally or locally. This reduces latency and improves security by blocking malicious traffic before it reaches its destination.

Further in the implementation depicted in FIG. 7, when the router 112 receives the GTP packets from the gNodeB 104, the provider edge router checks the inner IP packet encapsulated in GTP based on the BGP flow specification.

The process flow 800 for the control plane is illustrated in FIG. 8 and begins with step 802, wherein the UE 116 is attached to the gNodeB 104. At step 804, the gNodeB 104 signals to the AMF 402. At step 806, the AMF 402 signals to the SMF 202. At step 808, the SMF 202 and the UPF 206 establish a session for the particular UE 116. At step 810, the PFCP proxy 204 snoops PFCP messages between the SMF 202 and the UPF 206 to acquire the address for the UE 116, the TEID, and the address for the gNodeB 104. At step 812, the BGP controller 404 generates the BGP flow specification for the IP address range based on the address for the UE 116. At step 814, the BGP controller 404 updates the BGP flow specification route. At step 816, the router 112 programs a packet filter based on the received BGP flow specification.

The process flow 900 for the data plane is illustrated in FIG. 9 and begins at step 902, wherein the gNodeB 104 encapsulates the inner IP packet 416 generated by the UE 116 into the inner IP packet 416, a user datagram protocol (UDP) packet 418, a GPRS tunneling protocol (GTP) packet 420, and an IP (Internet protocol) packet 422. The process flow 900 continues and at step 904, the router 112 (one or more of the provider edge router or the cell site router) checks the source address for the IP packet 422. The router 112 checks the source address for the inner IP packet 416 when the GTP packet 420 arrives at the router 112. At step 906, the router 112 matches the source address in the inner IP packet 416 to the given address range updated by the BGP controller 404 within the BGP flow specification. If the packet is generated by the valid UE 116, the source address in the inner IP packet 416 shall be matched to a given address range updated by the BGP controller 404 within the BGP flow specification. At step 908, the router 112 forwards or drops the GTP packet 420. If the address is included in a given address range within the BGP flow specification, then the router 112 forwards the GTP packet 420 to the mobile backhaul 408. If the address is not included in the given address range within the BGP flow specification, then the router 112 filters or drops the received GTP packets 420. The packet filter information may be announced by the BGP controller 404 instead of the UE 116 route, and thus, this implementation does not require a significant quantity of routing entries.

FIG. 10 is a chart illustrating an example PDU session entry. The PFCP proxy 204 traps PDU session information exchanged between the SMF 202 and the UPF 206. The PFCP proxy 204 acquires the PDU session information per-UE 116 (i.e., per-IMSI). Multiple PDU sessions for a given UE 116 might be created with different SEID in order to assign multiple IP addresses to a given device.

Figure 11:
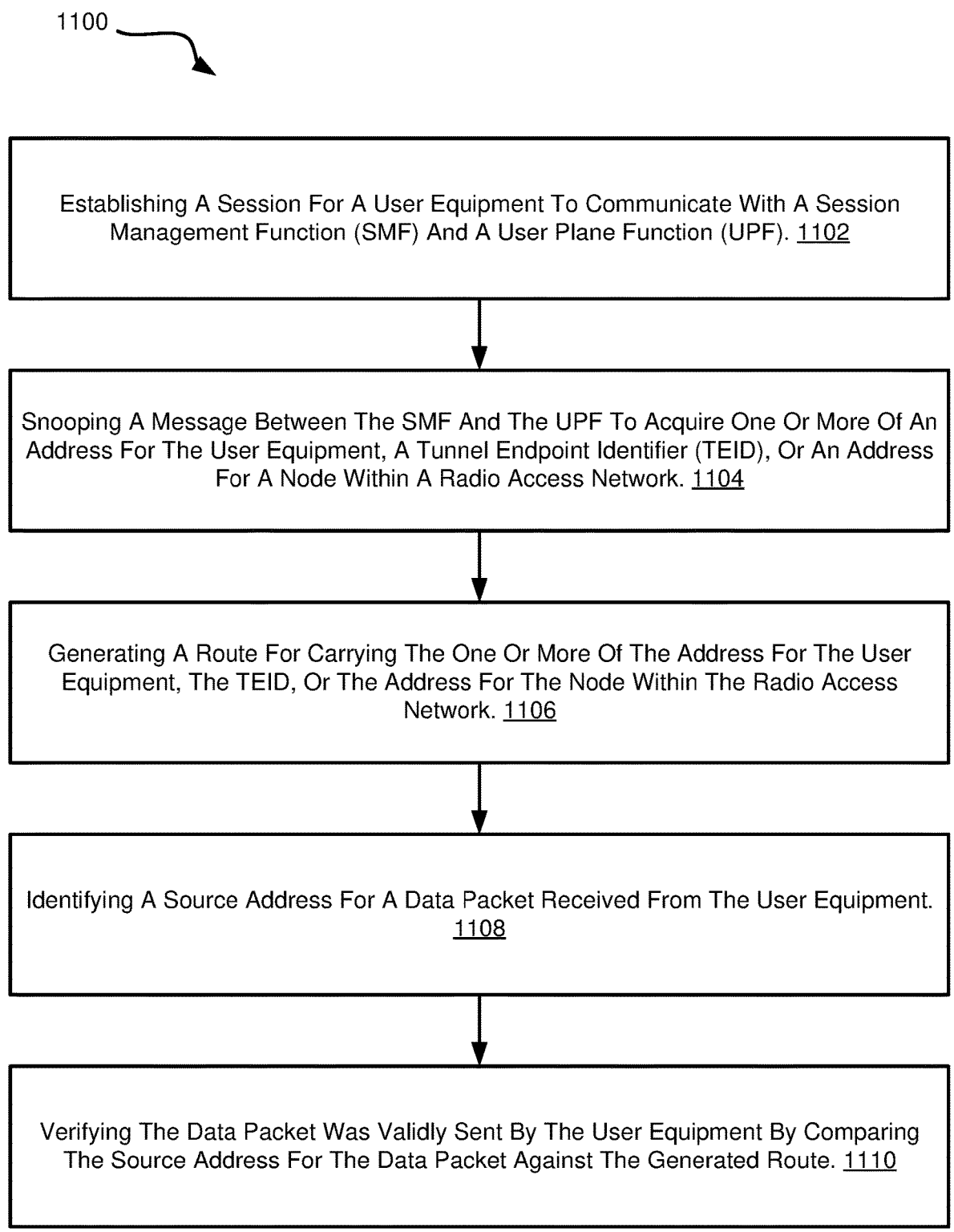
FIG. 11 is a schematic flow chart diagram of a method for preventing SIM spoofing within the mobile user plane.

FIG. 11 is a schematic flow chart diagram of a method 1100 for preventing spoofing of SIM within the mobile user plane. The method 1100 includes establishing at 1102 a session for a user equipment to communication with an SMF and a UPF. The method 1100 includes snooping at 1104 a message between the SMF and the UPF to acquire one or more of an address for the user equipment, a tunnel endpoint identifier (TEID), or an address for a node within a radio access network. The method 1100 includes generating at 1106 a route for carrying the one or more of the address for the user equipment, the TEID, or the address for the node within the radio access network. The method 1100 includes identifying at 1108 a source address for a data packet received from the user equipment. The method 1100 includes verifying at 1110 the data packet was validly sent by the user equipment by comparing the source address for the data packet against the generated route.

Figure 12:
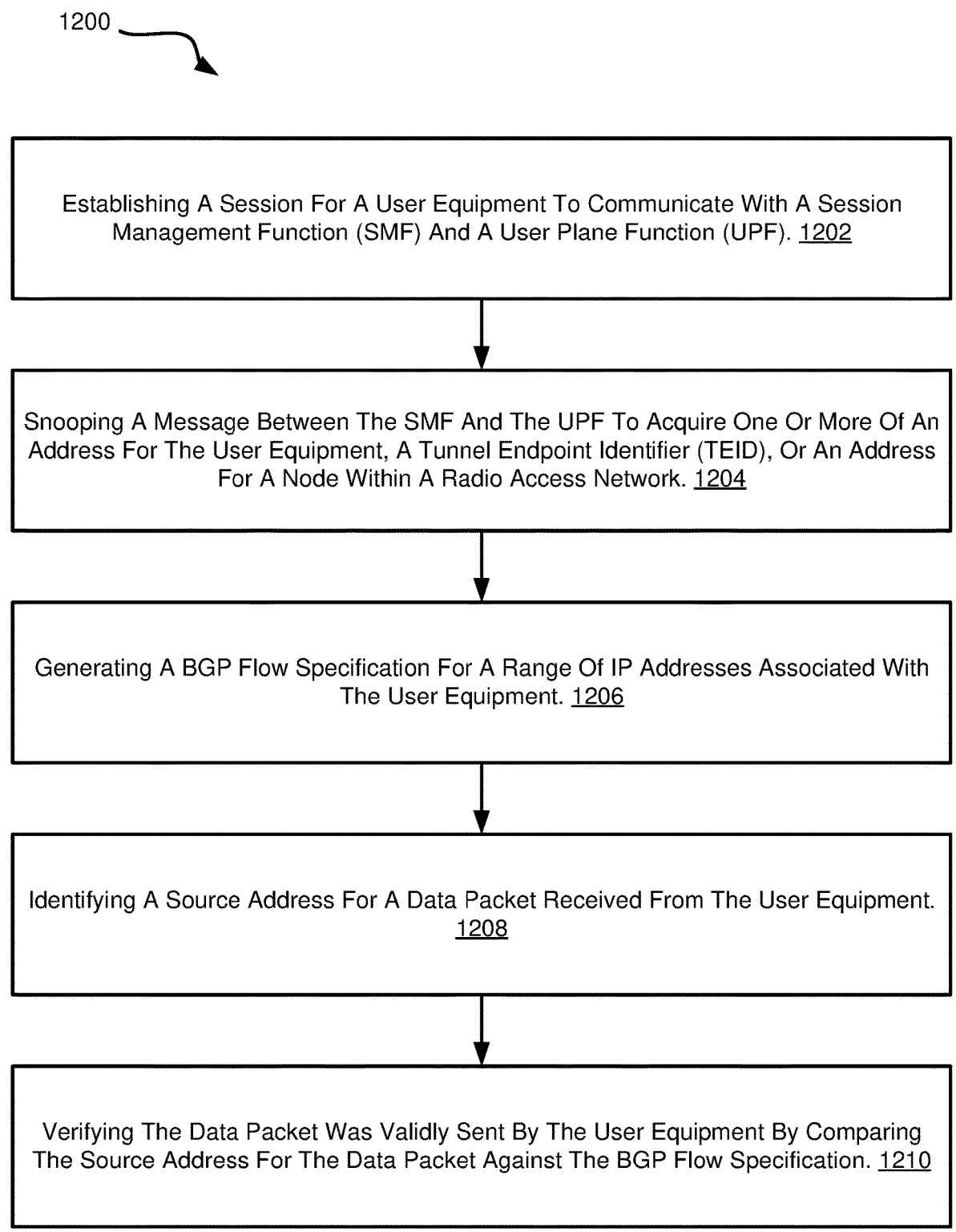
FIG. 12 is a schematic flow chart diagram of a method for preventing SIM spoofing within the mobile user plane.

FIG. 12 is a schematic flow chart diagram of a method 1200 for preventing spoofing of SIM within the mobile user plane. The method 1200 includes establishing at 1202 a session for a user equipment to communication with an SMF and a UPF. The method 1200 includes snooping at 1204 a message between the SMF and the UPF to acquire one or more of an address for the user equipment, a tunnel endpoint identifier (TEID), or an address for a node within a radio access network. The method 1200 includes generating at 1206 a BGP flow specification for a range of IP addresses associated with the user equipment. The method 1200 includes identifying at 1208 a source address for a data packet received from the user equipment. The method 1200 includes verifying at 1210 the data packet was validly sent by the user equipment by comparing the source address for the data packet against the BGP flow specification.

Figure 13:
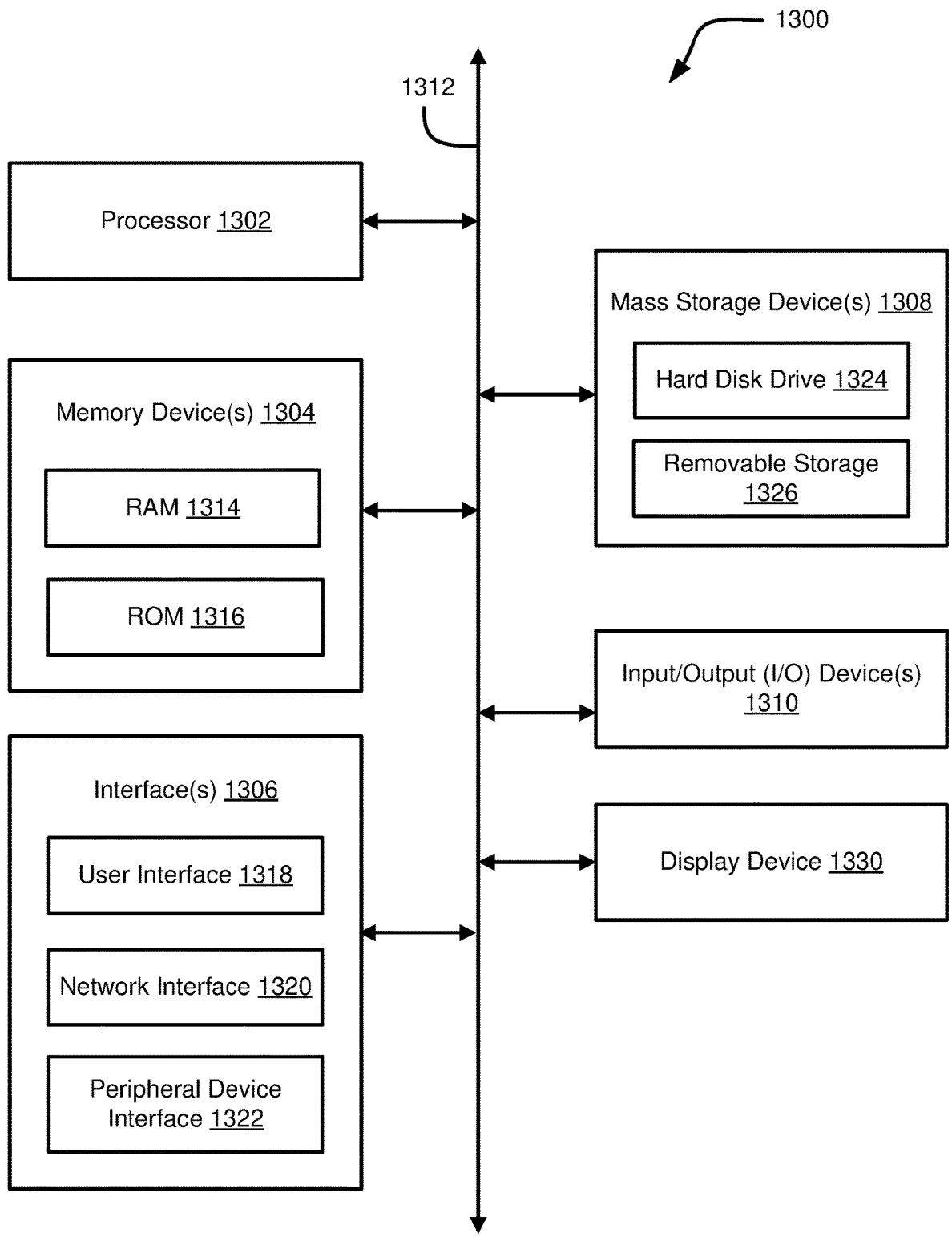
FIG. 13 is a schematic diagram illustrating components of an example computing device.

Referring now to FIG. 13, a block diagram of an example computing device 1300 is illustrated. Computing device 1300 may be used to perform various procedures, such as those discussed herein. In one embodiment, the computing device 1300 can function to perform the functions of the asynchronous object manager and can execute one or more application programs. Computing device 1300 can be any of a wide variety of computing devices, such as a desktop computer, in-dash computer, vehicle control system, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/output (I/O) device(s) 1302, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include several types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

Input/output (I/O) device(s) 1302 include various devices that allow data and/or other information to be input to or retrieved from computing device 1300. Example I/O device(s) 1302 include cursor control devices, keyboards, keypads, microphones, monitors or other display devices, speakers, printers, network interface cards, modems, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 may include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, or any suitable user interface now known to those of ordinary skill in the field, or later discovered), keyboards, and the like.

Bus 1312 allows processor(s) 1302, memory device(s) 1304, interface(s) 1306, mass storage device(s) 1308, and I/O device(s) 1302 to communicate with one another, as well as other devices or components coupled to bus 1312. Bus 1312 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1300 and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes establishing a session for a user equipment to communicate with a session management function (SMF) and a user plane function (UPF). The method includes snooping a message between the SMF and the UPF to acquire one or more of an address for the user equipment, a tunnel endpoint identifier, or an address for a node within a radio access network. The method includes generating a route for carrying the one or more of the address for the user equipment, the tunnel endpoint identifier, or the address for the node within the radio access network. The method includes providing the route to a router.

Example 2 is a method as in Example 1, further comprising attaching the user equipment to the node within the radio access network.

Example 3 is a method as in any of Examples 1-2, further comprising, in response to the node within the radio access network receiving a packet from the user equipment, causing the node within the radio access network to signal to an access and mobility management function (AMF).

Example 4 is a method as in any of Examples 1-3, further comprising causing the AMF to signal to the SMF, wherein the AMF signals to the SMF prior to establishing the session for the user equipment to communicate with the SMF and the UPF.

Example 5 is a method as in any of Examples 1-4, wherein snooping the message between the SMF and the UPF comprises a packet forwarding control protocol (PFCP) proxy snooping a PFCP message between the SMF and the UPF.

Example 6 is a method as in any of Examples 1-5, wherein generating the route comprises generating the route with a border gateway protocol (BGP) controller, and wherein the controller is further configured to update a corresponding Type1 ST route with the one or more of the address for the user equipment, the tunnel endpoint identifier, or the address for the node within the radio access network.

Example 7 is a method as in any of Examples 1-6, further comprising: receiving an inner Internet Protocol (IP) packet from the user equipment to the node within the radio access network; and encapsulating the inner IP packet into each of a user datagram protocol packet, a GPRS tunneling protocol (GTP) packet, and an IP packet.

Example 8 is a method as in any of Examples 1-7, further comprising causing the router to verify a source address for the inner IP packet.

Example 9 is a method as in any of Examples 1-8, further comprising: determining whether the inner IP packet was generated by the user equipment by determining whether a corresponding route for the user equipment has been announced by a BGP controller; and in response to determining the corresponding route for the user equipment was announced by the BGP controller, forwarding the GTP packet to a mobile backhaul.

Example 10 is a method as in any of Examples 1-9, wherein the mobile backhaul is a transport network configured to connect a core network to the radio access network.

Example 11 is a method as in any of Examples 1-10, further comprising: determining whether the inner IP packet was generated by the user equipment by determining whether a corresponding route for the user equipment has been announced by a BGP controller; and in response to determining the corresponding route for the user equipment was not announced by the BGP controller, discarding the GTP packet.

Example 12 is a method as in any of Examples 1-11, wherein discarding the GTP packet is performed to prevent subscriber identity module (SIM) spoofing.

Example 13 is a method as in any of Examples 1-12, wherein the user equipment is communicating with a 5G radio access network.

Example 14 is a method as in any of Examples 1-13, wherein the user equipment is a cellular device capable of communicate with the node within the radio access network.

Example 15 is a method as in any of Examples 1-14, wherein the node within the radio access network is a gNodeB within a 5G radio access network.

Example 16 is a method as in any of Examples 1-15, wherein the user equipment is associated with a unique IMSI (International Mobile Subscriber Identity), and wherein establishing the session for the user equipment comprises establishing a session for receiving packets from the unique IMSI.

Example 17 is a method as in any of Examples 1-16, wherein the route is a Type1 ST route.

Example 18 is a method as in any of Examples 1-17, wherein the router is a provider edge router.

Example 19 is a method as in any of Examples 1-18, wherein the router is a cell site router.

Example 20 is a method as in any of Examples 1-19, further comprising instructing the router to store the route within a corresponding routing table.

Example 21 is a method. The method includes generating a border gateway protocol (BGP) flow specification based on a range of Internet Protocol (IP) addresses associated with routes for one or more user equipment devices. The method includes in response to receiving a packet from a node within a radio access network, verifying an inner IP packet encapsulation based on the BGP flow specification.

Example 22 is a method as in Example 21, wherein the generating the BGP flow specification comprises generating with a BGP controller; and wherein the BGP controller communicates with a router to update an existing BGP flow specification for the one or more user equipment devices.

Example 23 is a method as in any of Examples 21-22, further comprising causing a router to filter incoming packets based on the BGP flow specification.

Example 24 is a method as in any of Examples 21-23, further comprising establishing a session for the user equipment device to communicate with a session management function (SMF) and a user plane function (UPF).

Example 25 is a method as in any of Examples 21-24, further comprising snooping a message between the SMF and the UPF to acquire one or more of an address for the user equipment device, a tunnel endpoint identifier, or an address for the node within the radio access network.

Example 26 is a method as in any of Examples 21-25, wherein snooping the message between the SMF and the UPF comprises a packet forwarding control protocol (PFCP) proxy snooping a PFCP message between the SMF and the UPF.

Example 27 is a method as in any of Examples 21-26, further comprising attaching each of the one or more user equipment devices to the node within the radio access network.

Example 28 is a method as in any of Examples 21-27, further comprising, in response to the node within the radio access network receiving a packet from one of the one or more user equipment devices, causing the node within the radio access network to signal to an access and mobility management function (AMF).

Example 29 is a method as in any of Examples 21-28, further comprising: receiving an inner Internet Protocol (IP) packet from at least one of the one or more user equipment devices to the node within the radio access network; and encapsulating the inner IP packet into each of a user datagram protocol packet, a GPRS tunneling protocol (GTP) packet, and an IP packet.

Example 30 is a method as in any of Examples 21-29, further comprising causing a router to verify a source address for the inner IP packet.

Example 31 is a method as in any of Examples 21-30, wherein verifying the inner IP packet encapsulation based on the BGP flow specification comprises determining whether the source address for the inner IP packet matches the range of IP addresses for the one or more user equipment devices.

Example 32 is a method as in any of Examples 21-31, further comprising, in response to determining the source address for the inner IP packet does not match the BGP flow specification, discarding the GTP packet.

Example 33 is a method as in any of Examples 21-32, wherein discarding the GTP packet is performed to prevent subscriber identity module (SIM) spoofing.

Example 34 is a method as in any of Examples 21-33, further comprising, in response to determining the source address for the inner IP packet matches the BGP flow specification, forwarding the GTP packet to a mobile backhaul.

Example 35 is a method as in any of Examples 21-34, wherein the mobile backhaul is a transport network configured to connect a core network to the radio access network.

Example 36 is a method as in any of Examples 21-35, wherein verifying the inner IP packet encapsulation based on the BGP flow specification comprises verifying with a router in communication with the node within the radio access network.

Example 37 is a method as in any of Examples 21-36, wherein the node within the radio access network is a gNodeB within a 5G radio access network.

Example 38 is a method as in any of Examples 21-37, wherein the router is a provider edge router.

Example 39 is a method as in any of Examples 21-38, wherein the router is a cell site router.

Example 40 is a method as in any of Examples 21-39, wherein the user equipment is associated with a unique IMSI (International Mobile Subscriber Identity), and wherein establishing the session for the user equipment comprises establishing a session for receiving packets from the unique IMSI.

Example 41 is a system. The system includes a session management function (SMF) within a radio access network. The system includes a user plane function (UPF) within the radio access network, wherein the UPF communicates with the SMF. The system includes a packet forwarding control protocol (PFCP) proxy between the SMF and the UPF, wherein the PFCP proxy snoops PFCP messages between the SMF and the UPF.

Example 42 is a system as in Example 41, further comprising a node within the radio access network, wherein the node receives a data packet form a user equipment device communicating via the radio access network.

Example 43 is a system as in any of Examples 41-42, further comprising a router in communication with the node, wherein the router comprises one or more of a provider edge router of a cell site router.

Example 44 is a system as in any of Examples 41-43, further comprising an access and mobility management function (AMF), wherein the node signals to the AMF in response to receiving a data packet form the user equipment device.

Example 45 is a system as in any of Examples 41-44, wherein the AMF signals to the SMF in response to receiving the data packet from the node.

Example 46 is a system as in any of Examples 41-45, wherein the PFCP proxy is in communication with a border gateway protocol (BGP) controller, and wherein the BGP controller is in communication with the router.

Example 47 is a system as in any of Examples 41-46, wherein the PFCP proxy snoops the PFCP messages between the SMF and the UPF to acquire one or more of an address of a user equipment device, a tunnel endpoint identifier, or an address for the node within the radio access network.

Example 48 is a system as in any of Examples 41-47, wherein the PFCP proxy snoops the PFCP messages between the SMF and the UPF to acquire each of an address of a user equipment device, a tunnel endpoint identifier, and an address for the node within the radio access network.

Example 49 is a system as in any of Examples 41-48, wherein the BGP controller generates a route for carrying each of the address of the user equipment device, the tunnel endpoint identifier, and the address for the node within the radio access network.

Example 50 is a system as in any of Examples 41-49, wherein the BGP controller provides the route to the router, and wherein the router updates a routing table with the router.

Example 51 is a system as in any of Examples 41-50, wherein the router verifies a source address for a data packet received from a user equipment device; and wherein the router determines whether the data packet was validly generated by the user equipment device based on the route received from the BGP controller and the source address.

Example 52 is a system as in any of Examples 41-51, wherein the router drops the IP packet in response to determining the data packet was not validly generated by the user equipment device; and wherein the router forwards the data packet to its destination in response to determining the data packet was validly generated by the user equipment device.

Example 53 is a system as in any of Examples 41-52, wherein the BGP controller generates a BGP flow specification based on a range of IP addresses associated with one or more user equipment devices.

Example 54 is a system as in any of Examples 41-53, wherein the node within the radio access network receives an inner Internet Protocol (IP) packet from a user equipment device; and wherein the node encapsulates the inner IP packet into each of a user datagram protocol packet, a GPRS tunneling protocol (GTP) packet, and an IP packet.

Example 55 is a system as in any of Examples 41-54, wherein the router verifies a source address for the inner IP packet.

Example 56 is a system as in any of Examples 41-55, wherein the router verifies the inner IP packet encapsulation based on the BGP flow specification to determine whether the source address for the inner IP packet matches the range of IP addresses associated with the one or more user equipment devices.

Example 57 is a system as in any of Examples 41-56, wherein the router discards the GTP packet in response to determining the inner IP packet does not match the BGP flow specification; and wherein the router forwards the GTP packet to its destination in response to determining the inner IP packet matches the BGP flow specification.

Example 58 is a system as in any of Examples 41-57, wherein the node within the radio access network encapsulate an inner IP packet received from a user equipment device into: the inner IP packet; a user datagram protocol (UDP) packet; a GPRS tunneling protocol (GTP) packet, and an IP packet.

Example 59 is a system as in any of Examples 41-58, further comprising: a user equipment device that provides data packets to the node within the radio access network; and an attacker attempting to spoof an identity of the user equipment device.

Example 60 is a system as in any of Examples 41-59, wherein the PFCP proxy snoops the PFCP messages between the SMF and the UPF to prevent spoofing by the attacker.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible considering the above teaching. Further, it should be noted that any or all the alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   generating a border gateway protocol (BGP) flow specification based on a range of Internet Protocol (IP) addresses associated with routes for one or more user equipment devices; and
   in response to receiving a packet from a node within a radio access network, verifying an inner IP packet encapsulation based on the BGP flow specification.

2. The method of claim 1, wherein the generating the BGP flow specification comprises generating with a BGP controller; and
   wherein the BGP controller communicates with a router to update an existing BGP flow specification for the one or more user equipment devices.

3. The method of claim 1, further comprising causing a router to filter incoming packets based on the BGP flow specification.

4. The method of claim 1, further comprising establishing a session for the user equipment device to communicate with a session management function (SMF) and a user plane function (UPF).

5. The method of claim 4, further comprising snooping a message between the SMF and the UPF to acquire one or more of an address for the user equipment device, a tunnel endpoint identifier, or an address for the node within the radio access network.

6. The method of claim 5, wherein snooping the message between the SMF and the UPF comprises a packet forwarding control protocol (PFCP) proxy snooping a PFCP message between the SMF and the UPF.

7. The method of claim 1, further comprising attaching each of the one or more user equipment devices to the node within the radio access network.

8. The method of claim 1, further comprising, in response to the node within the radio access network receiving a packet from one of the one or more user equipment devices, causing the node within the radio access network to signal to an access and mobility management function (AMF).

9. The method of claim 1, further comprising:
   receiving an inner Internet Protocol (IP) packet from at least one of the one or more user equipment devices to the node within the radio access network; and
   encapsulating the inner IP packet into each of a user datagram protocol packet, a GPRS tunneling protocol (GTP) packet, and an IP packet.

10. The method of claim 9, further comprising causing a router to verify a source address for the inner IP packet.

11. The method of claim 10, wherein verifying the inner IP packet encapsulation based on the BGP flow specification comprises determining whether the source address for the inner IP packet matches the range of IP addresses for the one or more user equipment devices.

12. The method of claim 11, further comprising, in response to determining the source address for the inner IP packet does not match the BGP flow specification, discarding the GTP packet.

13. The method of claim 12, wherein discarding the GTP packet is performed to prevent subscriber identity module (SIM) spoofing.

14. The method of claim 11, further comprising, in response to determining the source address for the inner IP packet matches the BGP flow specification, forwarding the GTP packet to a mobile backhaul.

15. The method of claim 13, wherein the mobile backhaul is a transport network configured to connect a core network to the radio access network.

16. The method of claim 1, wherein verifying the inner IP packet encapsulation based on the BGP flow specification comprises verifying with a router in communication with the node within the radio access network.

17. The method of claim 16, wherein the node within the radio access network is a gNodeB within a 5G radio access network.

18. The method of claim 16, wherein the router is a provider edge router.

19. The method of claim 16, wherein the router is a cell site router.

20. The method of claim 1, wherein the user equipment is associated with a unique IMSI (International Mobile Subscriber Identity), and wherein establishing the session for the user equipment comprises establishing a session for receiving packets from the unique IMSI.

\* \* \* \* \*